United States Patent Office 2,695,030
Patented Nov. 23, 1954

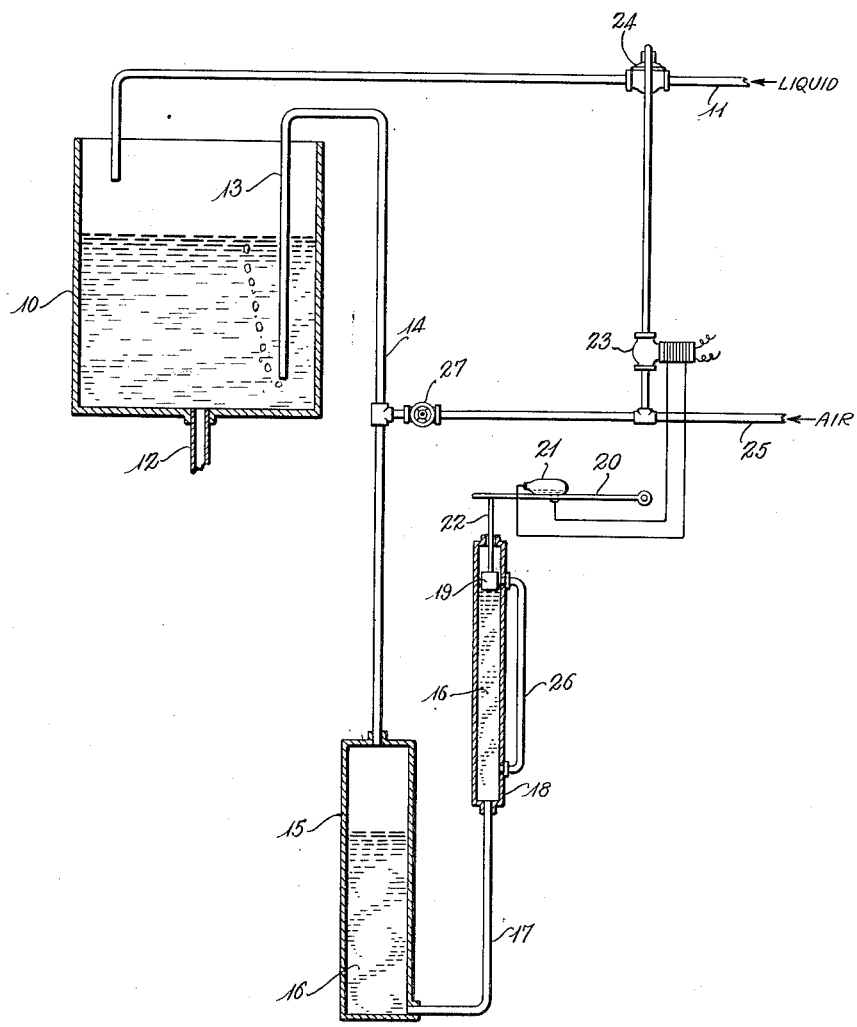

2,695,030

REMOTE LIQUID LEVEL CONTROL

Charles M. Rice, Candler, N. C., assignor to American Enka Corporation, Enka, N. C., a corporation of Delaware Application March 11, 1952, Serial No. 276,019

1 Claim. (Cl. 137—412)

This invention relates to automatic control mechanisms and more particularly to an automatic control mechanism responsive to the level of liquid contained in a remotely situated tank.

The primary object of this invention is to provide an arrangement whereby the level of liquid in a tank may be closely maintained within desired limits in an automatic manner. Another object is to provide an arrangement for automatically controlling the liquid level in a remotely situated tank while at the same time indicating the level of liquid in the tank at a particular moment.

Other objects and advantages of this invention will be apparent upon consideration of the following detailed description in conjunction with the annexed drawing, which shows a diagrammatic view of one arrangement of the invention.

Referring to the drawing, 10 designates an open liquid storage tank having at its bottom an opening 12 for withdrawing liquid from the tank. A pipe 11 is provided for supplying liquid to the tank. An air bubbler pipe 13 is so mounted that it terminates near the bottom of tank 10. Pipe 13 is connected to conduit 14 which is also connected to the top of a receptacle 15. A vertical tube 18 is disposed adjacent to receptacle 15 and at a slightly higher elevation. The bottom of tube 18 is connected with the bottom of receptacle 15 by means of pipe 17. Pipe 17 and part of receptacle 15 and tube 18 are filled with a liquid 16, such as water. A float 19 rides on the surface of the liquid 16 in tube 18 and rises and falls with the level of the liquid in the tube. A glass sight gage 26 visually indicates the level of liquid in tube 18. Mounted above tube 18 on pivot arm 20 is a mercury switch 21. Float 19 is provided with a vertical extension 22 adapted to contact pivot arm 20 and cause switch 21 to open and close, depending on the level of liquid in tube 18.

Mercury switch 21 is electrically connected to a solenoid air valve 23. Diaphragm valve 24, which controls the introduction of liquid into tank 10, is connected to air supply line 25 through solenoid valve 23.

The operation of the above arrangement to automatically control the liquid level in storage tank 10 is as follows: air from any convenient source is supplied to conduit 14 through control valve 27. Valve 27 is adjusted so air is introduced into pipe 13 under sufficient pressure to overcome the head pressure of the liquid in storage tank 10 and bubble up through the liquid in the storage tank. This results in the creation of a substantially uniform pressure throughout conduit 14 and pipe 13 equal to the head of liquid above the open end of pipe 13. This same pressure is transmitted to vessel 15 where it causes the level of liquid 16 to fall in vessel 15 and rise in tube 18 until the differential head is equal to the pressure in conduit 14 and pipe 13.

When liquid is withdrawn from storage tank 10 through opening 12 the head of liquid above the lower end of pipe 13 decreases and the pressure in conduit 14 decreases proportionally. This results in a lower pressure being transmitted to vessel 15 and to the surface of the liquid therein. The lower pressure causes the liquid level in tube 18 to fall, carrying float 19 with it. The falling of float 19 causes pivot arm 20 to drop, closing mercury switch 21. This energizes solenoid air valve 23 and causes diaphragm valve 24 to open and admit liquid to tank 10. As long as the liquid level in storage tank 10 remains low the pressure in conduit 14 will remain low and diaphragm valve 24 will remain open. As the liquid level in storage tank 10 rises the pressure in conduit 14 gradually increases causing the float in tube 18 to rise higher. Finally, when the liquid level in storage tank 10 reaches a desired height, the movement of the float, transmitted through float extension 22 and pivot arm 25, will be sufficient to open mercury switch 21 and cause diaphragm valve 24 to close.

The height of liquid 16 in tube 18 is of course proportional to the amount of liquid in storage tank 10 and may be visually observed at all times in sight gage 26. Gage 26 is preferably calibrated so the quantity of liquid in storage tank 10 may be ready directly. In practice, if storage tank 10 is situated in a remote location, it is preferable to arrange the various elements so that tube 18 is in a control room or other place where sight gage 26 may be conveniently observed when desired.

Tube 18 is preferably constructed with a relatively small diameter compared with receptacle 15 so that even small changes in the air pressure in conduit 14 will be indicated by an appreciable change in the position of float 19. While this arrangement has been found to furnish very close control, the sensitivity of the control mechanism may be varied even further if desired. For example, increased sensitivity may be obtained by shortening the length of pivot arm 20, thereby causing the mercury switch to respond more rapidly when the pivot arm swings up or down. The sensitivity may also be varied by changing the specific gravity of the liquid contained in tube 18 and receptacle 15. By the use of a liquid more dense than water, the sensitivity will be decreased. With the use of a liquid less dense than water, the movement of the liquid level in tube 18 will be magnified and the sensitivity will be increased.

Once the air supply through the control valve has been adjusted, the present system requires no attention and will operate indefinitely to control the level of liquid in the storage tank. The system is of particular utility in installations where the liquid storage tank is remotely situated since the tube and float assembly occupy little space and can be placed where they may be conveniently observed and serviced. Since the only part of the control apparatus in contact with the liquid in the storage tank is the bubbler pipe, this system is especially useful for controlling the level of a corrosive liquid. In view of the remote location of the float, turbulence in the tank does not affect the operation of this system. The indicating and control apparatus may be located at any elevation with respect to the storage tank, and at any reasonable distance from it.

While a preferred embodiment of this invention has been described, it is to be understood that other embodiments within the scope and spirit of this invention will occur to those skilled in the art.

What is claimed is:

Apparatus for indicating and controlling the level of liquid in a tank comprising the combination of a first conduit for introducing a gas under pressure underneath the surface of the liquid in said tank, a first receptacle closed to the atmosphere and containing liquid, a second conduit connected between the upper part of first receptacle and said first conduit, a second receptacle substantially smaller than said first receptacle in cross sectional area and containing liquid, a third conduit connecting the bottom of said first receptacle to the bottom of said second receptacle, means for visually indicating the level of liquid in said second receptacle, a float inside said second receptacle, and electrical means actuated by said float to control the introduction of liquid into said tank.

References Cited in the file of this patent

UNITED STATES PATENTS

| Number | Name | Date |
|---|---|---|
| 1,823,491 | Heghinian | Sept. 15, 1931 |
| 1,962,676 | Albright | June 12, 1934 |
| 2,147,977 | Kalle | Feb. 21, 1939 |
| 2,368,616 | Rosenberger | Feb. 6, 1945 |
| 2,471,026 | Eby | May 24, 1949 |
| 2,625,167 | Gess | Jan. 13, 1953 |